United States Patent [19]

Narabu et al.

[11] Patent Number: 5,081,346

[45] Date of Patent: Jan. 14, 1992

[54] SOLID STATE IMAGING DEVICE INCLUDING A ROD LENS ARRAY

[75] Inventors: Tadakuni Narabu; Masahide Hirama; Yasuo Nakada, all of Kanagawa, Japan

[73] Assignee: Sony Corporation, Tokyo, Japan

[21] Appl. No.: 550,511

[22] Filed: Jul. 10, 1990

[30] Foreign Application Priority Data

Jul. 13, 1989 [JP] Japan ................. 1-180857

[51] Int. Cl.⁵ .......................... H01J 40/14
[52] U.S. Cl. .................. 250/208.1; 250/227.2; 358/484
[58] Field of Search ........... 358/484; 250/208.1, 250/208.2, 227.11, 227.2; 350/96.25

[56] References Cited

U.S. PATENT DOCUMENTS

| | | | |
|---|---|---|---|
| 4,005,285 | 1/1977 | Price | 250/208.1 |
| 4,146,786 | 3/1979 | Agulnek | 250/208.1 |
| 4,524,372 | 6/1985 | De Cock et al. | 250/208.1 |
| 4,775,791 | 10/1988 | Owen et al. | 358/484 |
| 4,942,483 | 7/1990 | Kinoshita | 358/484 |

FOREIGN PATENT DOCUMENTS

0144089 6/1985 European Pat. Off. .

*Primary Examiner*—David C. Nelms

[57] ABSTRACT

A solid state imaging device with a plurality of line sensors in which each line sensor receives the light through the divided light paths from a straight line of a document into each unit is disclosed. The divided light paths are obtained by bending each rod lens of the rod-lenses array, providing concave or convex lenses or convex mirrors or by providing transparent plates at different angles. As a result of the dividing of light path the line sensors pick up linear image data without abutting each sensor in a straight line.

16 Claims, 8 Drawing Sheets

SOLID STATE IMAGING DEVICE INCLUDING A ROD LENS ARRAY

BACKGROUND OF THE INVENTION

1. Field of the Invention

This invention relates to a solid state imaging device constituted by plural line sensors and, more particularly, to an intimate contact type solid state imaging device for forming an image of the equal size to the document size on the line sensor.

2. Description of the Prior Art

An intimate contact type image sensor, for forming an equimultiple size image as the document on a line sensor, is widely used in a facsimile or duplicator in that it can be reduced in size when assembled as compared with a reduced size optical system image sensor.

Meanwhile, since limitations are imposed on the longitudinal size of each line sensor, it is necessary with an intimate contact type image sensor to have a plurality of line sensors arrayed in the document scanning direction to provide a so-called multi-chip construction, with a view to reading wider documents.

As such a multi-chip type solid state imaging device, there are known a device of a so-called in-line type in which the line sensors are arrayed on a straight line, or a staggered type in which the line sensors are arrayed in alternate two rows. There is also known a technique, such as is shown in the Japanese Patent Publication Laid Open No. 61-126861, in which the ends of the line sensors are arrayed obliquely and the line sensors are arrayed in a straight line.

Meanwhile, in an in-line type solid state imaging device in which the line sensors are arrayed in a straight line, since there are lacking photodiodes of the line sensors at the joints between the line sensors, signal fluctuations at the joints present a problem.

In a so-called staggered array solid state imaging device, since the line sensor joints overlap, no problem in the joint occurs. However signal processing becomes complex since temporal shifting is produced by the two rows of the sensors and the enlargement and reduction by zooming or the like.

In the techniques shown by the above Patent Publication, the sensors are arrayed in a straight line. Similarly, positional accuracy at the ends presents a problem and assembling is not that easy.

As a technique for solving the above mentioned technical problem, the present Applicant has proposed an intimate contact type image sensor in the specification and drawings of the Japanese Patent Application No. 63-4943 which is an intimate contact type image sensor in which the light path is derived from an optical block to read straight type data.

SUMMARY OF THE INVENTION

It is an object of the invention to provide an improved solid state imaging device for picking up straight data of documents in a scanning direction.

It is a more specific object of the invention to provide an improved solid state imaging device which employs a technique of dividing the light path by an optical block.

According to the invention, a solid state imaging device comprises a plurality of line sensors in which linear image data are picked up. In order to pick up the linear image data, the linear light path from a document is divided into a plurality of units corresponding to the line sensors. Each unit of the light path is bent or converged so that the difficulty of assembling the line sensors in a straight line is prevented.

In one embodiment of the invention, a rod lens array in which one end of the rod lenses are arrayed in substantially a straight line on the document side and the other ends of the rod lenses are arrayed in a staggered relation is provided. The line sensors are arrayed in correspondence with the staggered relation.

In another embodiment of the invention, the solid state imaging device comprises a plurality of concave or convex lenses or convex mirrors for converging the light from a document in the scanning direction for each unit of the scanning direction. In one particular embodiment, a rod lenses array having rod lenses which are bent for dividing the light path into plural units in the scanning direction is provided and functions a converging means for each unit.

In a further embodiment of the invention, the solid state imaging device comprises a plurality of transparent plates which are provided at different angles for each unit, and a rod lenses array having rod lenses arrayed in a straight line.

All of these preferred embodiments are able to pick up the linear data in the scanning direction from the document by eliminating the necessity for abutting the line sensors in a straight line.

DETAILED DESCRIPTION OF THE PREFERRED EMBODIMENTS

First Embodiment

The solid state imager of the present embodiment is so designed that the light from the document is allocated by a bent rod lens.

Figure 1:
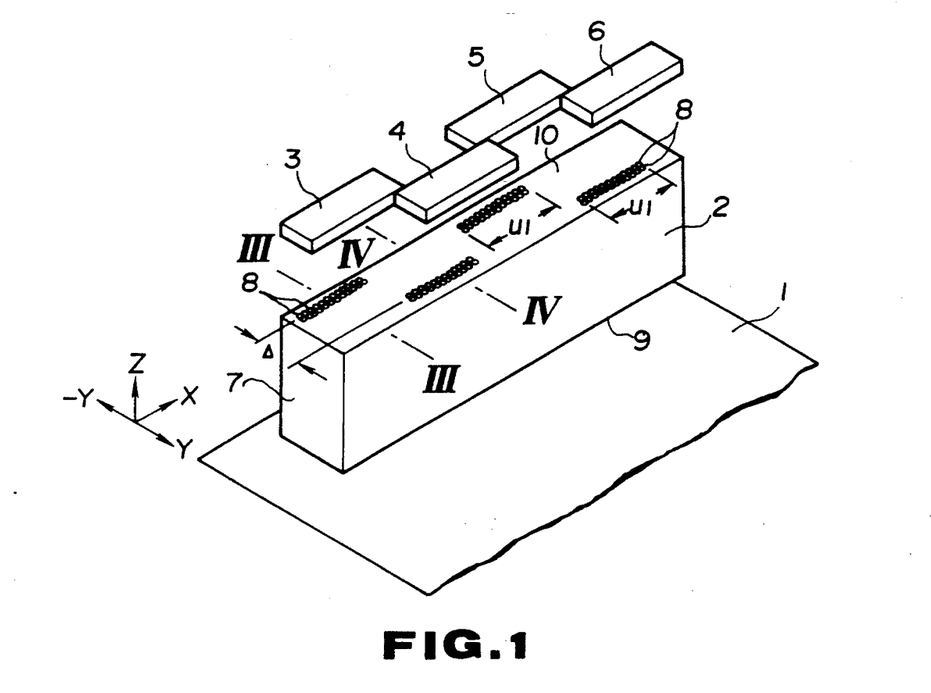
FIG. 1 is an exploded perspective view showing a first embodiment of the solid state imager of the present invention.

FIG. 1 shows the arrangement in an exploded view. The solid state imager of the present embodiment includes a rod lens array 2 in opposition to a document 1. On the rod lens array 2 are provided four line sensors 3, 4, 5, 6 in a staggered arrangement. The rod lens array 2 has a substrate 7 which is generally rectangular and has the direction X as the longitudinal direction, which is the document scanning direction, in accordance with the width of the document 1. Each rod lens 8 provided in the substrate 7 has a structure which is bent in different directions at an interval of a unit length $u_1$ consistent with the size of the line sensors 3 to 6.

Figure 3:
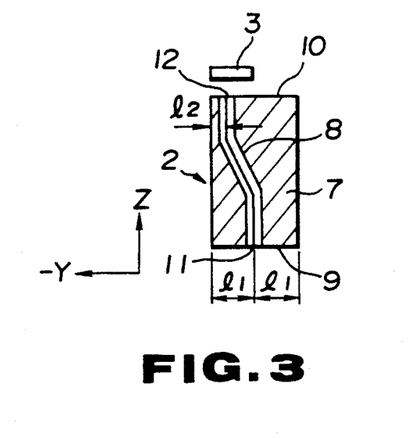
FIG. 3 is a cross-sectional view of the first embodiment, taken along line III—III of FIGS. 1.
Figure 4:
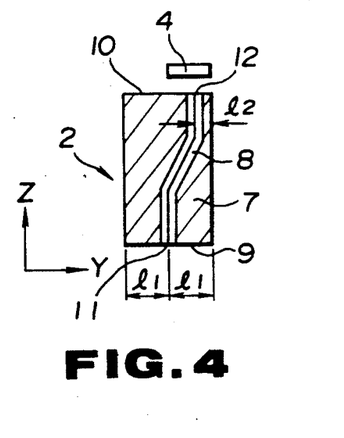
FIG. 4 is a cross-sectional view of the first embodiment taken along line IV—IV of FIG. 1.

FIGS. 3 and 4 are cross-sectional views showing the manner of decoding of each of the rod lens 8.

As shown in FIG. 3, in each unit portion corresponding to the line sensor 3, an end 11 of the rod lens 8 is provided at substantially the center at an equal distance $l_1$ from both ends of the substrate 7 or the lower surface 9 on the document side. The rod lenses 8 are extended therefrom in the direction Z and then bend in the direction $-Y$ to reach the upper surface 10 towards the line sensor 3, where the rod lens 8 has its other end 12 offset by a distance $l_2$ from the end of the substrate 7. With each rod lens 8, having such bent form the light from the document is guided along the contour to exit at the other end offset from the center towards the $-Y$ side. The rod lenses 8 are bent similarly at the unit portion corresponding to the line sensor 5.

Referring now to FIG. 4, in a unit portion corresponding to the line sensor 4, the rod lens 8 has one end 11 at substantially the center at an equal distance $l_1$ from either ends of the substrate 7 on the bottom surface 9 towards the document side. Thus, on the bottom side 9 towards the document, the one ends 11 are arrayed in substantially a straight line across the width of the document 1 continuously without interruptions at the seams of the unit length $u_1$. The rod lenses 8 of the portions corresponding to the line sensors 4 are extended therefrom in the direction Z and are bent in the direction Y which is opposite to that in the case of the line sensor 3. The rod lenses 8 are bent and exposed at the other ends 12 at a position offset by a distance $l_2$ from the end of the substrate 7 so as to cause the light from the document to exit at the other end 12 from the center in the Y-direction. It is noted that the rod lenses 8 are bent similarly in the unit portions corresponding to the line sensor 6.

In this manner, the rod lenses 8 of the unit portion corresponding to the line sensor 3 and the rod lenses 8 of the unit portion corresponding to the line sensor 4 are bent in mutually opposite directions, as a result of which the other ends 12 per each unit length $u_1$ faces the upper surface 10 with an offset $\Delta(=2l_1-l_2)$ in the Y-direction.

Figure 2:
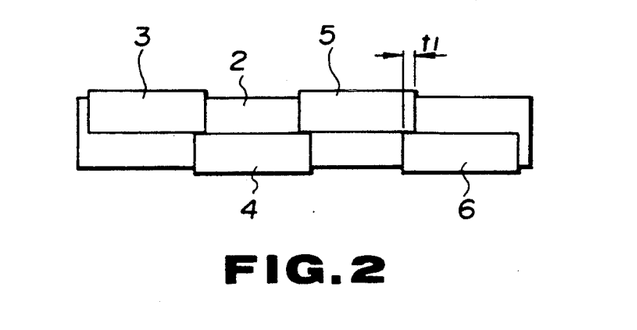
FIG. 2 is a plan view of the first embodiment.

FIG. 2 is a plan view. As shown in FIG. 2, the line sensors 3 to 6 are in a staggered arrayed and are provided in accordance with the other ends 12 allocated for each unit length $u_1$. Although the line sensors 3 to 6 deviate in the Y-direction, the ends overlap by a distance $t_1$ in the X-direction. Hence, the portions at the ends of the line sensors 3 to 6 which are without photodiodes are compensated by the photodiodes of the adjoining line sensors provided with an offset $\Delta$ so that no data dropout occurs at the seam portion. At the light receiving surfaces of these staggered line sensors 3 to 6, the images on the document 1 are formed, and electrical signals corresponding to the document are produced.

With the above described solid state imaging device of the present embodiment, the rod lenses 8 are provided on the bottom surface 9 of the rod lens array 2 facing the document 1 in a consecutive straight array so as to read out document data which is arrayed in a straight line. In addition, the light is divided at each unit length $u_1$ along the bent rod lens 8. By such division, the line sensors 3 to 6 are arrayed in a staggered relationship on the upper surface 10 of the rod lens array 2 so as to enable the document to be read without data dropout at the seams.

Although the position deviation in the Y-direction among the adjoining line sensors 3 to 6 is $\Delta$ and the light from the document 1 is allocated alternately in the above embodiment, the light may be divided in more than two directions, as a modification, in which case the line sensors may be arrayed at the other ends allocated in plural directions.

Second Embodiment

The present embodiment is an example in which the rod lens array is constituted by the block of the rod lens bent with the substrate of the rod lens array.

Figure 5:
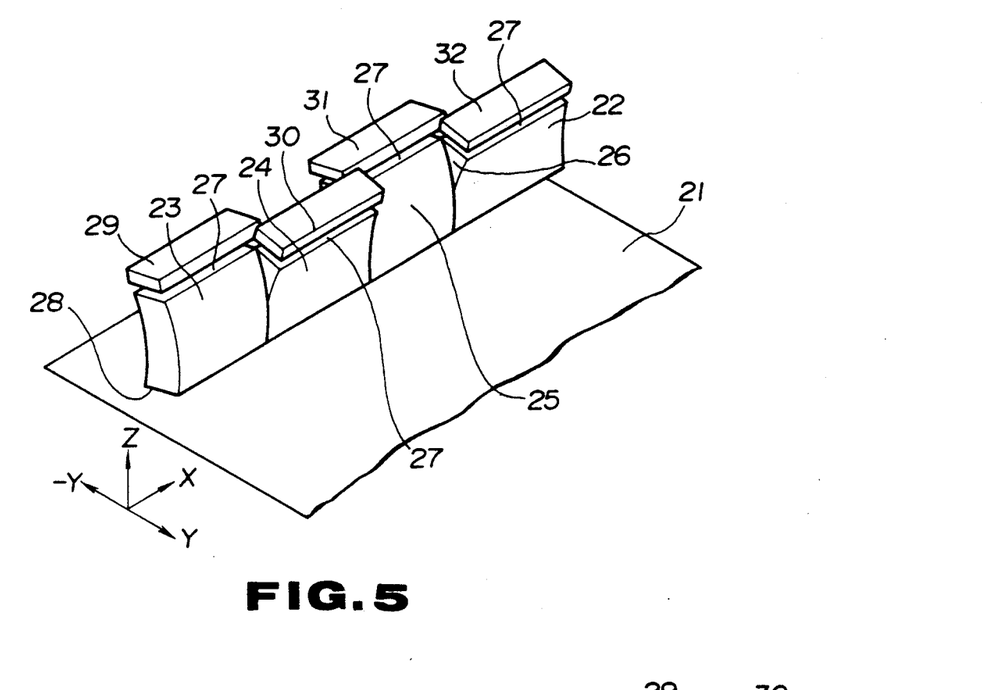
FIG. 5 is a perspective view of a second embodiment of the solid state imager of the present invention.

Such arrangement is shown in FIG. 5. As shown in FIG. 5, the solid state imaging apparatus of the present embodiment is provided with a rod lens array 22 consisting of four blocks 23, 24, 25, 26 bent in alternately different directions for facing the document 21, and the line sensors 29, 30, 31, 32 are provided for facing the upper surfaces 27 of the blocks 23 to 26 of the rod lens array 22.

The rod lens array 22 consists of the four blocks 23 to 26 which have their bottoms 28 arrayed in a substantially straight line in a direction X which is the document scanning direction in the drawing. On these bottoms, the one ends of the rod lenses are arrayed in a straight line in the direction X on the bottom surface 28. The light proceeding direction on one end of the bottom surface 28 is substantially in the Z direction. The blocks 23 to 26 are inclined gradually in the Y or $-Y$ direction as they rise in the Z-direction. The blocks 23 and 25 are inclined in the $-Y$ direction in the drawing, whereas the blocks 24 and 26 are inclined in the Y direction in the drawing. Within the interior of the blocks 23 to 26, the rod lenses are arrayed along the center of the blocks and as tilted therewith, with the other ends of the rod lenses facing substantially the centerlines of the upper surfaces 27 allocated in the left and right directions as seen from the direction X which is the document scanning direction. The light outgoing direction at the other ends is inclined from the Z-direction. The size in the X direction of the blocks 23 to 26 corresponds to the size of the line sensors 29 to 32. The tilt in the Y or $-Y$ direction which does not caused the line sensors to abut on one another is satisfactory.

Figure 6:
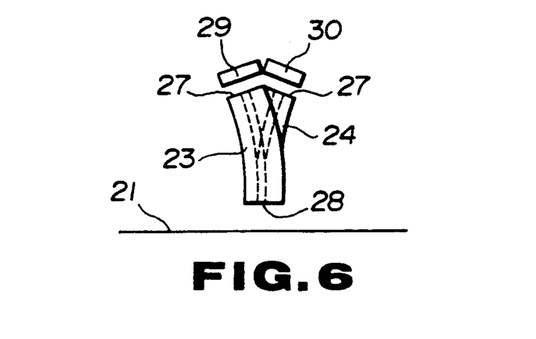
FIG. 6 is a side view of the second embodiment.

FIG. 6 is a side elevational view of the present embodiment, wherein, since the blocks 23 to 26 are provided with a tilt, the rod lens array 22 presents a side elevation in the form of the letter of gamma. The line sensors 29 to 32 are provided towards the upper surfaces of the blocks 23 to 26 with the light from the other end of the rod lens incident to the line sensors 29 to 32.

With the above described solid-state imaging apparatus of the present embodiment, the bottom surfaces 28 of the blocks 23 to 26 are arrayed substantially in a straight line, so that the document 21 in the X-direction in the drawing can be obtained without data dropout. In addition, in the present solid state imaging apparatus, since the one-line light is allocated depending upon the tilt of the blocks 23 to 26, there is no necessity of providing the line sensors in a straight line so that problems such as assembling accuracy at the seam portions are not raised.

Although the number of the blocks is four, the number of blocks may be equal to an integer which is not less than two can be used as a number of the line sensors.

Third Embodiment

The present embodiment is an example comprising a rod lens array consisting of four rectangular blocks, with the blocks being provided consecutively in the letter of V in the document scanning direction.

Figure 7:
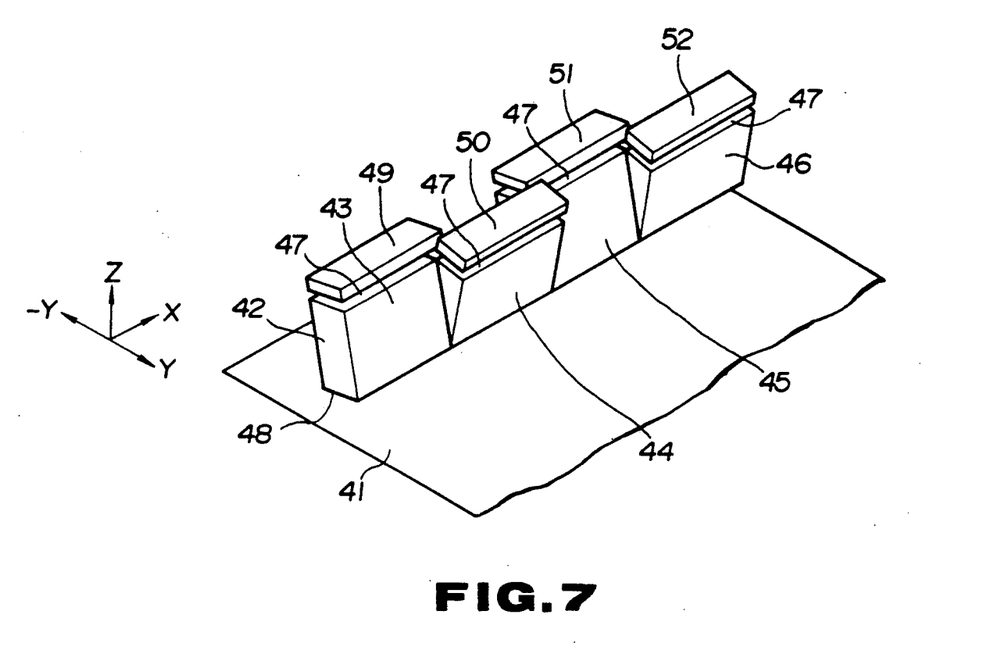
FIG. 7 is a perspective view of a third embodiment of the solid state image of the present invention.

FIG. 7 shows such arrangement. As shown in FIG. 7, the solid state imaging apparatus of the present embodiment includes a rod lens array 42 consisting of four blocks 43, 44, 45, 46 which extend obliquely upwardly in the alternate directions from the surface of the document 41 for facing the document 41. The line sensors 49, 50, 51 and 52 are provided for facing the upper surfaces 47 of the blocks 43 to 46 of the rod lens array 42.

Figure 8:
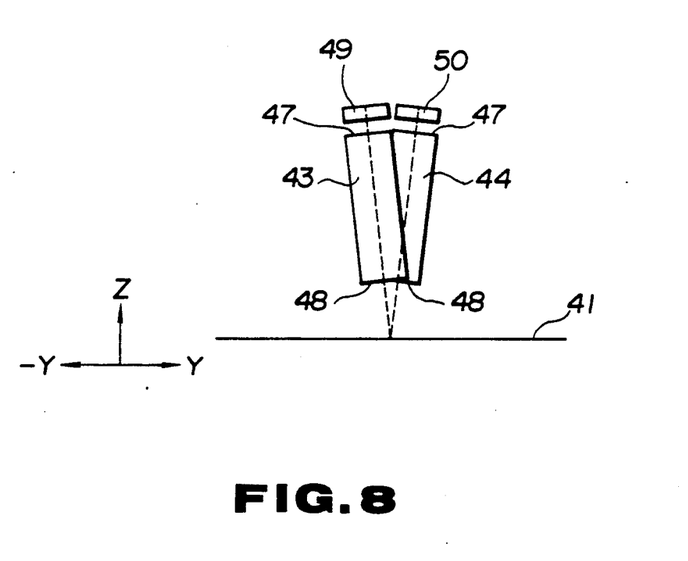
FIG. 8 is a side view of the third embodiment.

Referring to the rod lens array 42, as shown in FIG. 8, the size in the x-direction, which is the document scanning direction of the blocks 43 to 46, is the size corresponding to the line sensors 49 to 52, and the blocks 43 and 45 are inclined in the −Y direction in the drawing, whereas the blocks 44 and 46 are inclined in the Y direction in the drawing. The rod lenses in the blocks 43 to 46 are mounted in both ends in the X-direction at the center, and pass through the upper surface 47 and the bottom surface 48 of each block. The one end face of the rod lens facing the bottom surfaces 48 of the blocks 43 and 45 are provided for reading the light from one line of the document. The end faces of the rod lenses facing the bottom surfaces 48 of the blocks 44 and 46 forming the letters V with the blocks 43 and 45 are similarly provided for reading out the same line of the same document 41.

With the above described solid-state imaging apparatus of the present embodiment, the one line data in the X-direction of the document can be read by the alternately inclined rod lens array 42 shaped in the letter V and without providing the line sensors 43 to 46 in a straight line. Thus the data dropout at the line sensor end does not raise any problem and the manufacture by assembling may be accomplished.

It is noted that, although the number of blocks is four, it may be any integer equal to 2 or more. There is no limitation of the angle of the letter V as long as the line sensors 43 to 46 do not abut each other.

Fourth Embodiment

The embodiment is an example of a solid-state imaging apparatus employing a concave lens.

Figure 9:
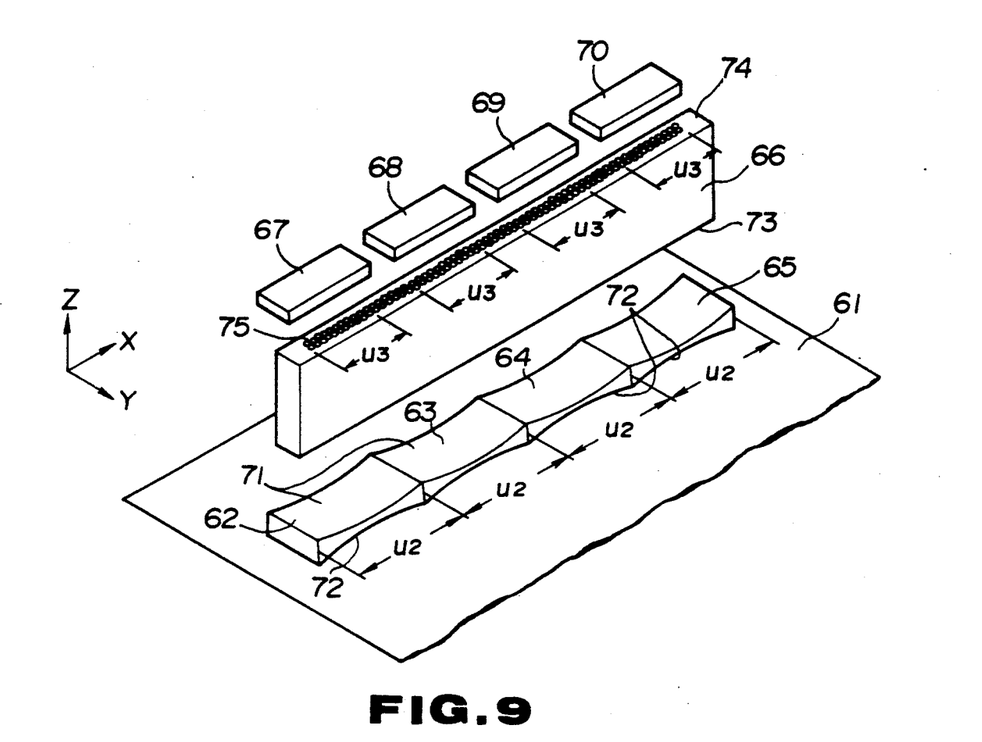
FIG. 9 is a perspective view of a fourth embodiment of the solid state imager of the present invention.

FIG. 9 is an exploded perspective view. As shown in FIG. 9, the solid-state imaging apparatus is made up of four concave lenses 62, 63, 64 and 65 each having a length of $u_2$ and provided consecutively in the X-direction in the drawing which is the scanning direction for the document 61. A collimating rod lens array 66 and four line sensors 67, 68, 69, 70 are arrayed with certain interval in a straight line.

The concave lenses 62 to 65 are provided consecutively for dividing the light from the document 61 at unit lengths $u_2$ in the X-direction. Each of the concave lenses has a curvature on its upper surface 71 and its bottom surface 72 for collimating the light in the X-direction such that it has a thickness in the Z-direction which is thin at the center and thick at the ends. The concave lenses 62 to 65 do not change in thickness in the Y direction so that they collimate the light from the document only in the X-direction. These concave lenses 62 to 65 are provided on the document side of the rod lens array 66.

The rod lens array 66 has the shape of an elongated parallelepiped with the X-direction as the longitudinal direction as a function of the width of the document 61, and includes a plurality of rod lenses 75 which conduct the light in the Z-direction in the drawing for and extend from the bottom surface 73 to the upper surface 74 of the rod lens array 66. The rod lenses 75 are so arrayed that the one ends are aligned consecutively in the X-direction and it is by these rod lenses 75 that the light from the document 61 is conducted towards the sensors.

The line sensors 67 to 70 are arrayed in the X-direction as the longitudinal direction, with the light receiving surfaces facing the other ends of the rod lenses 75 of the rod lens array 66. The line sensors 67 to 70 are spaced apart from one another without the line sensors 67 to 70 abutting each other.

Figure 10:
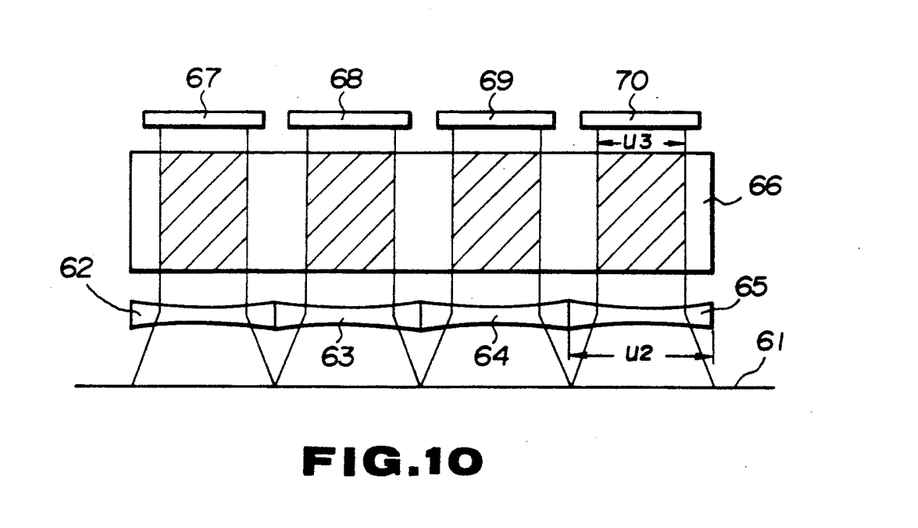
FIG. 10 is a schematic side view of a fourth embodiment.

With the above described solid state imaging apparatus of the present embodiment, as shown in FIG. 10, the light from the document 61 in the X-direction is collimated by the collimating function of the concave lenses 62 to 65. Thus, on passing through the concave lenses 62 to 65, the light from the document is collimated from the X-direction length $u_2$ to the X-direction length $u_3$, with the collimated light outgoing from the other end of the rod lens 75 after passing through the rod lens array 66. The light from the document thus collimated to the length $u_3$ falls onto the line sensors 67 to 70 and photoelectrically converted at the photodiodes of the line sensors 67 to 70 to obtain the electrical signals which are consistent with the document 61.

The one-line reading in the X-direction is performed continuously with the solid-state imaging apparatus. The inline type disposition of the line sensors 67 to 70 suffices and data at the sectioned ends are collimated so as to be read reliably by the line sensors 67 to 70 so that data dropout at the sensor ends is not produced.

Although the line sensors are separated from one another in the present embodiment, the line sensors may abut on one another in accordance with the collimating function of the concave lenses without causing data dropout.

Fifth Embodiment

The present embodiment is a modification of the solid-state imaging apparatus of the fourth embodiment wherein the rod lens array sides of the concave lenses are in the planar form.

Figure 11:
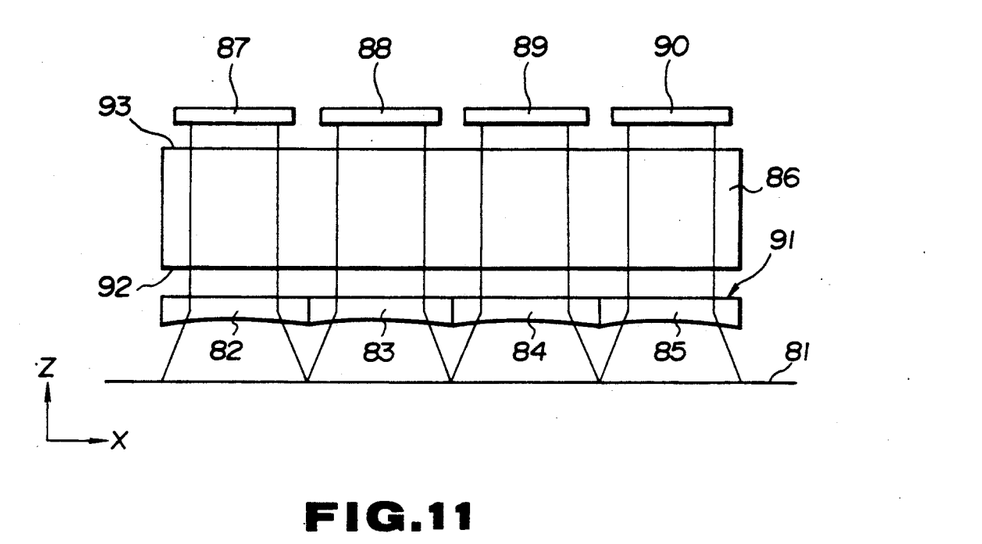
FIG. 11 is a schematic side view of a fifth embodiment of a solid-state imager of the present invention.

The arrangement is shown in FIG. 11. On a document 81 are placed four concave lenses 82 to 85 for dividing the light from the document 81 by unit lengths in the X-direction which is the scanning direction. Each of the concave lenses 82 to 85 has increased thickness at the ends in the X-direction and decreased thickness at the central portion, with the upper surface 91 under the rod lens array 86 being in the flattened form.

The rod lens array 86 provided on the flattened upper surface 91 has its bottom surface 92 facing the upper surface 91 and is in the form of an elongated parallelepiped with the direction X as the longitudinal direction as a function of the width of the document 81. The rod lens array 86 is provided with a plurality of rod lenses which conduct the light in the direction Z in the drawing from the bottom 82 to the upper surface 93. The rod lenses are consecutively arrayed in the X-direction at the one ends and the light from the document 81 is conducted towards the sensors via these rod lenses.

The four line sensors 87 to 90 are linearly arrayed with the X-direction as the longitudinal direction with an interval from each other, with the light receiving sides facing the other ends of the rod lenses of the rod lens array 86.

With the above described solid-state imaging apparatus of the present embodiment, similarly to the collimating function of the converging lenses 82 to 85, with the one-line light from the document 81 being divided into units, the light thus divided into units fall on the line sensors 87 to 90 facing the upper surface 93 of the rod lens array 86 after passing through the rod lens array 86. In these line sensors 87 to 90, photo-electric conversion is performed in the photodiodes whereby electrical signals are taken out are taken out in accordance with the document 81 as required.

With the above described solid-state imaging apparatus of the present embodiment, the light from the document is collimated by the concave lenses 82 to 85 after division in the X-direction, so that the light from the document is received at the linearly arranged line sensors 87 to 90. In this manner, data on the scanning line may be obtained without substantial deviation and are collimated after division so that the problem of the line sensor seams is obviated. The sides of the rod lens array 86 of the convex lenses 92 to 85 are in a flattened shape so that the flat sides of the concave lenses 82 to 85 can be abutted with the rod lens array 86 so that the assembling accuracy is improved.

Sixth Embodiment

The present embodiment is a modification of the fifth embodiment of the solid-state imaging apparatus wherein the document sides of the concave lenses are flattened.

Figure 12:
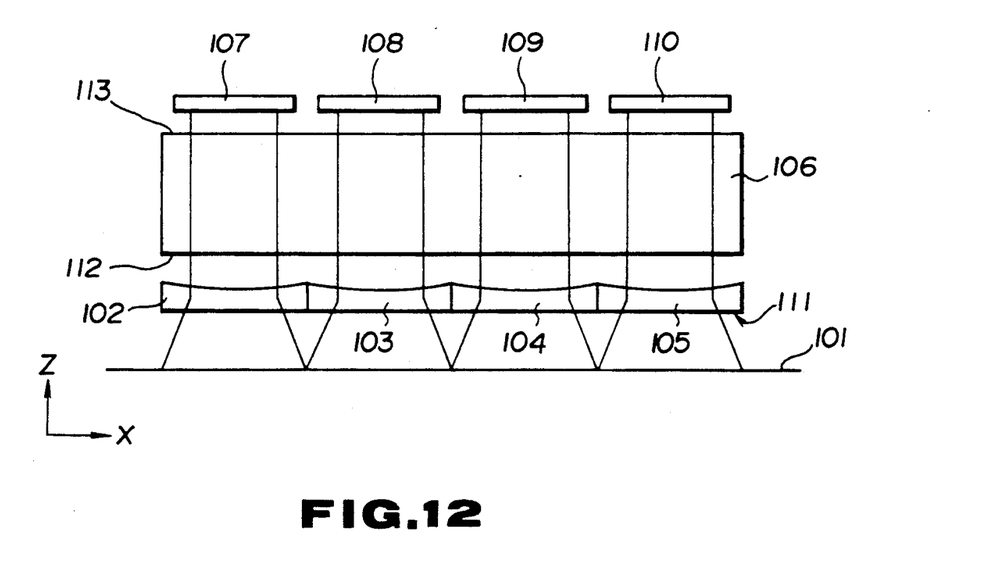
FIG. 12 is a schematic side view of a sixth embodiment of the solid state imager of the present invention.

The arrangement is shown in FIG. 12 wherein, on the document 101, four concave lenses 102 to 105 are arrayed consecutively for dividing the light from the document 101 into unit lengths in the X-direction which is the scanning direction. Conversely to the solid-state imaging apparatus of the fifth embodiment, the bottom surfaces 111 of the concave lenses 102 to 105 on the document side are flattened. The concave lenses 102 to 105 constitute the same flat surface.

On the top of these concave lenses 102 to 105 is formed a rod lens array 106. The rod lens array 106 has its bottom side 112 facing the concave lenses 102 to 105 and is in the form of an elongate rectangle with the X-direction as the longitudinal direction as a function of the width of the document 101. A plurality of rod lens adapted for conducting the light in the direction Z are provided and pass from the bottom side 112 to the upper side 113. The rod lenses are provided so that the one ends are arrayed in a line continuously in the X-direction and the light from the document 101 is conducted via these rod lenses towards the sensor.

Similarly to the fifth embodiment, four line sensors 107 to 110 are separated one from the other in a straight line with the X-direction as the longitudinal direction with their light receiving sides facing the other ends of the rod lenses of the rod lens array 106.

With the above described solid state imaging apparatus of the present embodiment, similarly to the fifth embodiment, the light in the X-direction is collimated by the collimating function of the concave lenses 102 to 105 for dividing the one-line light from the document 101 into unit lengths. The light thus divided into unit lengths is passed through the rod lens array 106 before being received by the line sensors 107 to 110 and converted photo-electrically.

With the above described solid-state imaging apparatus, the light from the document is divided in the X-direction and collimated so that the data at the divided ends are not impaired and the light from the document may be received by light sensors 107 to 110 arrayed in a straight line. The result is that data of the scanning lines on the document may be obtained without substantial deviation and the problem of the line sensor ends may be solved due to divisional collimation. Also, since the document sides of the concave lenses 102 to 105 are flattened, assembling and handling is facilitated.

Seventh Embodiment

The present embodiment is an example of a solid-state imaging apparatus in which the light in the X-direction which is the document scanning direction is collimated by a convex mirror for receiving the light from the document divided by the line sensors arrayed in a straight line.

Figure 13:
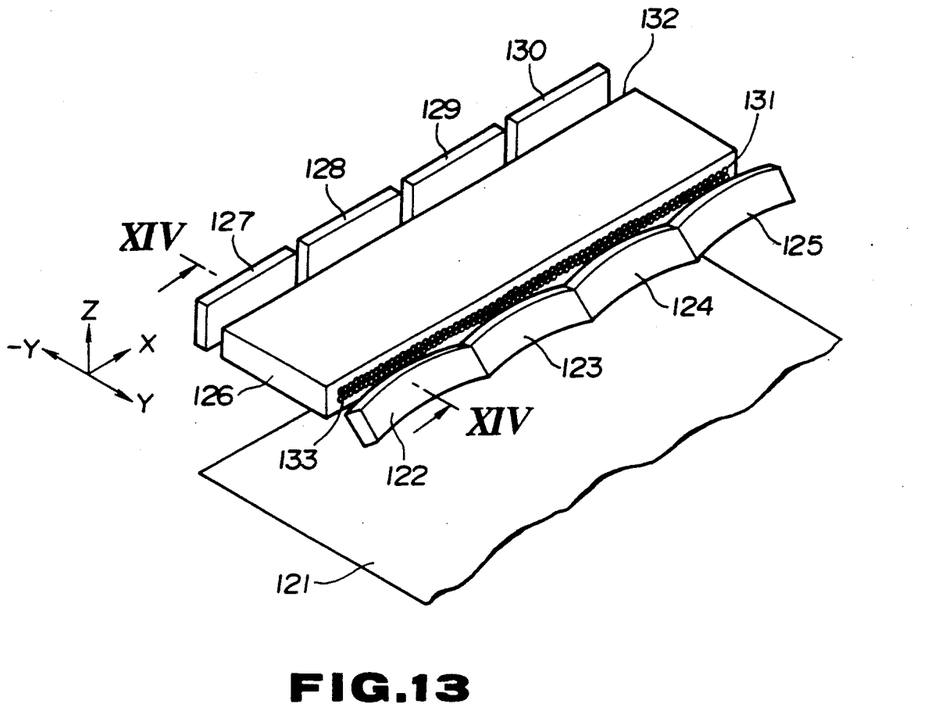
FIG. 13 is a perspective view of a seventh embodiment of the solid state imager of the present invention.

The arrangement is shown in FIG. 13 and is comprised of four consecutive convex mirrors 122, 123, 124 and 125, a rod lens array 126 for collimating the light from the convex mirrors 122 to 125 and four line sensors 127, 128, 129, 130 adapted for receiving the light for photo-electrical conversion.

The convex mirrors 122 to 125 reflect the light from the document 121 to one end 131 of the rod lens array 126 and have the function of collimating the X-direction light which is the document scanning direction. The contour of the convex mirrors 122 to 125 is such that the overall mirror surfaces are inclined at about 45° with respect to the document surface and the mirror surfaces are opened slightly towards the other sides at both ends in the X-direction. The convex mirrors 122 to 125 are provided so as to be continuously arrayed in the X-direction with the ends in the X-direction abutting to each other.

The rod lens array 126 is provided at the same height as the convex mirrors 122 to 125, that is, in the −Y direction of the convex mirrors 122 to 125, with one end face 131 of the rod lens array 126 facing the convex mirrors 122 to 125. The light from the document 121 reflected at the convex mirrors 122 to 125 inclined at the approximate angle of 45° falls on the end of the rod lens 133 provided in a straight line in the X-direction for facing the one end face 131. This rod lens array 125 has a plurality of rod lenses 133 for conducting the light in the −Y direction in the drawing. These rod lenses 133 are provided for passing from one end face 131 to the other face 132.

Four line sensors 127 to 130 are provided at the other end face 132 of the rod lens array 126 in association with the convex mirrors 122 to 125. These line sensors 127 to 1309 are arrayed in a straight line in the X-direction with a spacing from one another with the X-direction as the longitudinal direction, with the light receiving surface facing the other face 132 of the rod lens array 126. Thus the light from the rod lens array 126 is photo-electrically converted by the line sensors 127 to 130.

Figure 14:
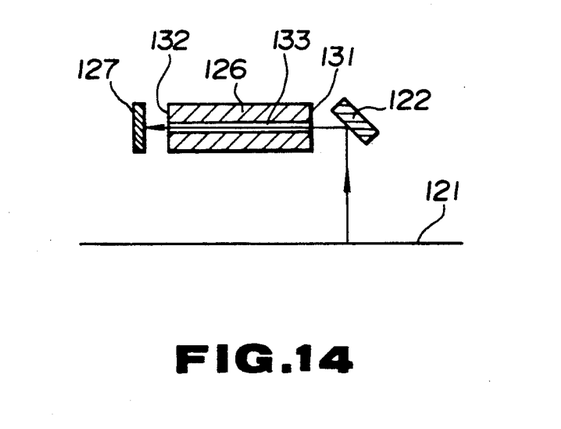
FIG. 14 is a cross-sectional view along line XIV—XIV of FIG. 13.
Figure 15:
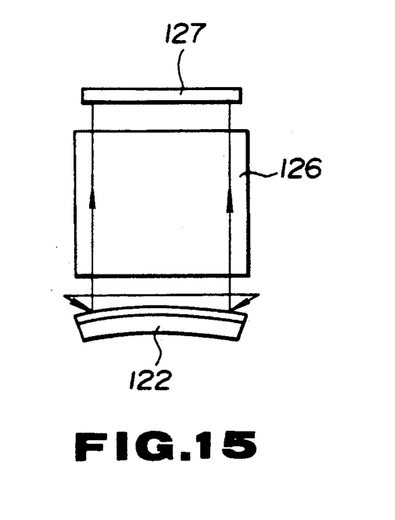
FIG. 15 is a plan view for illustrating the light path for one unit of the seventh embodiment.

Referring to FIGS. 14 and 15, the light path from the document is explained. The one-line light from the document 121 along the X-direction proceeds in the Z-direction to fall on the convex mirrors 122 to 125. Each of the convex mirrors 122 to 125 has a curvature such that the X-direction ends are opened outwardly so that the light on the same line and towards the ends is reflected towards the inside. Thus the light of the scanning line on the document 121 is divided into four units in the X-direction to fall on the rod lens 133 of the rod lens array 126 in the thus divided state. The light incident on the rod lens 133 is passed through the rod lens 133 to exit from the other end face 132 so as to be received by photodiodes of the line sensors 127 to 130 for photo-electrical conversion into electrical signals.

With the above described solid-state imaging apparatus of the present embodiment, the light from the straight-line document is divided into unit lengths by the convex mirrors 122 to 125 so as to be received by the line sensors 127 to 130. Hence, the data may be read without substantial differences on the sole scanning line and, since the light is collimated with separate unit lengths, there is no problem concerning data dropout at the line sensor ends.

Although four convex mirrors and line sensors are provided in the above embodiment, other numbers can be used. Although the mounting angle in a plane perpendicular to the X-direction of the convex mirror is ca. 45°, this also is not limitation but any other mounting angle may be used in consideration of the arrangement of the light source or the like.

Eighth Embodiment

The present embodiment is an example of a solid-state imaging apparatus employing a convex lens.

Figure 16:
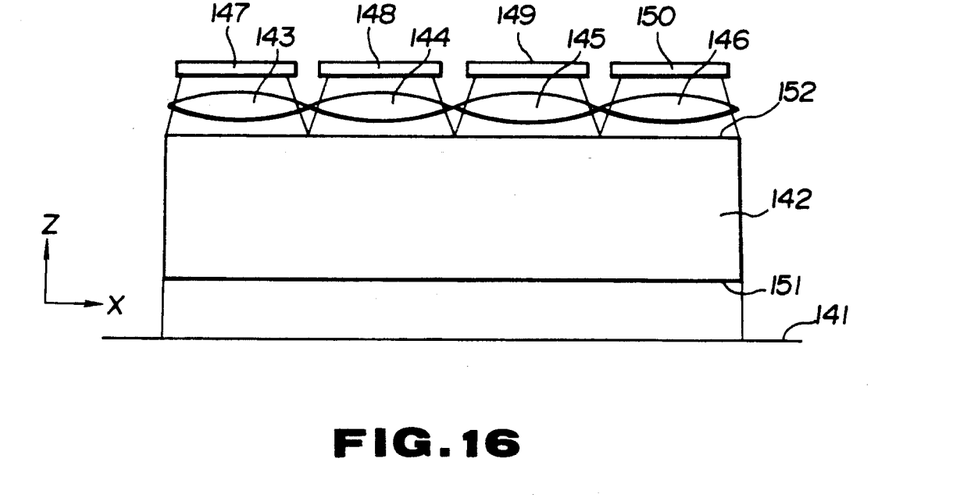
FIG. 16 is a schematic side view showing an eighth embodiment of the solid state imager of the present invention.

FIG. 16 shows a schematic construction. A rod lens array 142 is provided so that it has one end 151 facing a document 141. This rod lens array 142 is comprised of a plurality of rod lenses in the X direction which is the scanning direction of the document 141, and allows the light from the document to pass in the Z direction. Four convex lenses 143, 144, 145 and 146 are provided at the other end 152 of the rod lens array 142. The contour of the convex lenses 143 to 146 is such that only the lens thickness in the Z direction are changed, with the ends being thin and the central part being thickened. The four convex lenses 143 to 146 are arrayed in a straight line in the X-direction with the ends being contiguous and there being no gap between the ends.

On the sides of these convex lenses 143 to 146 opposite to the rod lens array 142, four line sensors 147, 148, 149, 150 are provided on a straight line with their longitudinal directions as the X-direction and with the ends spaced apart from one another. The line sensors 147 to 150 are arrayed in association with the convex lenses 149 to 150, with the convex lenses 143, 144, 145 and 146 being associated with the line sensors 147, 148, 149 and 150, respectively, for receiving the light from the associated convex lenses.

With the above described solid-state imaging apparatus of the present embodiment, the one scanning line light from the document 141 falls on the rod lens array 142. The light falling on the rod lens array 142 exits from the other end 152 of the rod lens array 142 to fall on the convex lenses 143 to 146. The light is collimated in the X-direction in each of the convex lenses 143 to 146, while the light incident on the end of the convex lens is bent towards the center of the convex lens. By this collimating function, the one scanning line light from the document 141 is divided by the convex lenses 143 to 146 into four unit lengths so as to be received by the associated line sensors 147 to 150.

With the solid state imaging apparatus of the present embodiment, the one-line light from the document 141 is divided so as to be received by the associated line sensors 147 to 150. Thus the received light is derived from one and the same scanning line so that electrical signals suitable for zooming are produced. Since the light is collimated by the convex lenses 143 to 146, the light at the ends of the convex lenses are included within the range of the line sensors to prevent data dropout at the terminal portions.

Although biconvex lenses are shown in FIG. 16, the plans-convex lenses may also be used. The number of division of the light from the document is not limited to four.

Ninth Embodiment

The present embodiment is an example in which the straight line light from the document is received by staggered line sensors using transparent plates.

Figure 17:
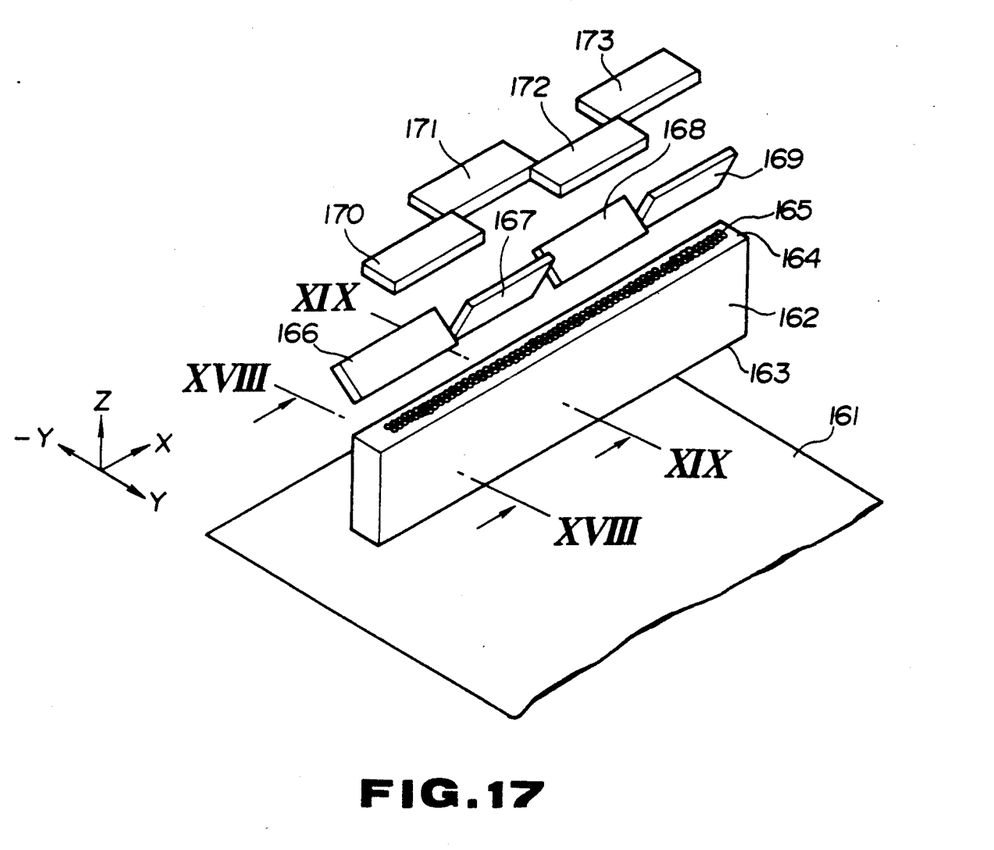
FIG. 17 is a perspective view of a ninth embodiment of the solid state imager of the present invention.

The solid-state imaging apparatus of the present embodiment is shown basically in FIG. 17 and includes, as shown in FIG. 17, a rod lens array 162 in the form of a parallelepiped having the X-direction in the drawing on the direction of scanning the document 161 as the longitudinal direction, four transparent plates 166, 167, 168 and 169 having the function of splitting the light path of the light from the rod lens array 162, and four line sensors 170, 171, 172 and 173 corresponding to these transparent plates 166, 167, 168 and 169.

The rod lens array 162 has plural rod lenses 165 for passing from the bottom surface 163 to the upper surface 164, with the direction of the optical axis of the rod lens 165 being the Z-direction in the drawing which is normal to the document 161. Each rod lens 165 is arrayed in a straight line along the X-direction, which is the document scanning direction, for permitting passage of a certain straight light of the document 161.

On the upper side 164 of the above rod lens array 162, four rectangular transparent plates 166 to 169, having the X direction as the longitudinal direction, are provided with every other transparent plate 166 or 168 having an inclination on the upper surface in the Y direction in the drawing, with the transparent plates 167, 169 having their upper surfaces inclined in the −Y direction in the drawing. The transparent plates 166 to 169 abut another without being separated so that the totality of the document scanning light falls necessarily on the transparent plates 166 to 169. These transparent plates 166 to 169 are made of a material, such as glass plates, and have a required refractive index to bend the light path on the upper and lower surfaces of the transparent plates.

Each of the four line sensors 170 to 173 provided in association with these four transparent plates 166 to 169 has its light receiving surface as the downturned sides 166 to the transparent plates 166 to 169. The longitudinal direction of these line sensors 170 to 173 are the X-direction which is the document scanning direction. The line sensors 170 to 173 are staggered, that is, the line sensors 170 and 172 are provided with an offset in the Y direction above the document scanning direction. The ends of the line sensors 170 to 173 are overlapped at the ends in the X-direction with the positional relation being the same as explained in connection with FIG. 2. By the staggered disposition of the line sensors 170 to 173, the light allocated for each unit length by the transparent plates 166 to 169 may be received, and electrical signals may be obtained without dropout of the split light at the terminal portions.

Figure 18:
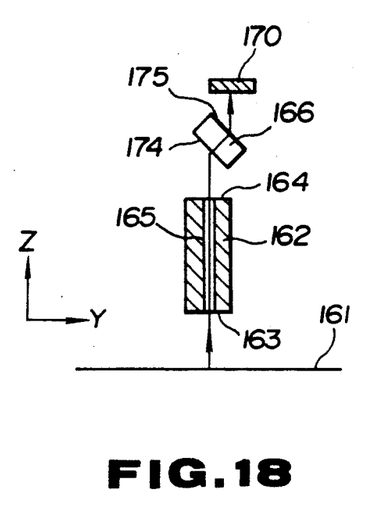
FIG. 18 is a cross-sectional view along line XVIII—XVIII of FIG. 17.
Figure 19:
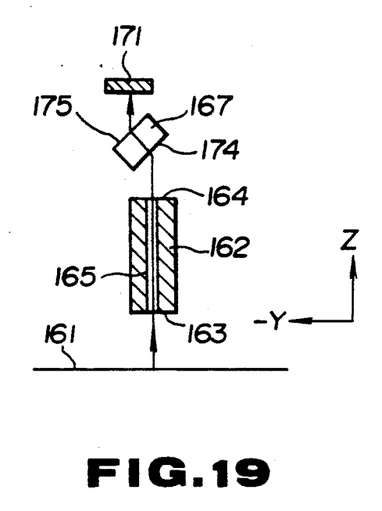
FIG. 19 is a cross-sectional view along line XIX—XIX of FIG. 17.

Referring to FIGS. 18 and 19, the light path at the transparent plates at the different angles will be explained.

First, as shown in FIG. 18, with the unit of the transparent plate 166, the light from the document 161 proceeds in the Z direction so as to be directly guided to the rod lens 165 of the rod lens array 162 to exit from the upper surface 164 of the rod lens array 162. The outgoing light falls on the transparent plate 166 having its upper surface 175 inclined in the Y-direction so as to be refracted at the bottom surface 174 and the upper surface 175 so that ultimately the light is caused to exit with an offset in the Y-direction. The light proceeds in the Z-direction with the direction remaining deviated in the Y-direction before being received by the line sensor 170.

Also, as shown in FIG. 19, as regards the unit of the transparent plate 167, the light from the document 161 proceeds similarly in the Z-direction so as to be conducted to the rod lens 165 of the rod lens array 162 to exit from the upper surface 164 of the rod lens array 162. Meanwhile, the outgoing light falls on the transparent plate 167 having its upper surface 175 inclined in the −Y direction so as to be refracted at the bottom surface 174 and the upper surface 175 so that ultimately the light is caused to exit with an offset light path in the −Y direction. The light proceeds in the Z-direction with the light remaining deviated in the −Y direction so as to be received by the line sensor 171.

With the above described solid-state imaging apparatus of the present embodiment, the light path is refracted by unit lengths by the transparent plates 166 to 169, so that the line sensors 170 to 173 are not arrayed in line, but are staggered, so that data dropout at the terminal portions of the line sensors is not produced. Since the light received by the line sensors is derived from the sole scanning line of the original document, signal processing such as reduction or enlargement can be performed without compliancies.

As for the mounting angle of the transparent plates, such an angle will suffice which will not cause the refraction to be produced to cause the line sensor ends to abut on each other. The direction of allocating the light by unit lengths is not limited to two. Although the number of units is four in the above embodiment, it is not to be so limited and may be an integer equal to two or more.

10. Tenth Embodiment

The present embodiment is an example in which the rod lens of the rod lens array is bent and in which the collimation in the X-direction or the document scanning direction is achieved by using the rod lens array.

Figure 20:
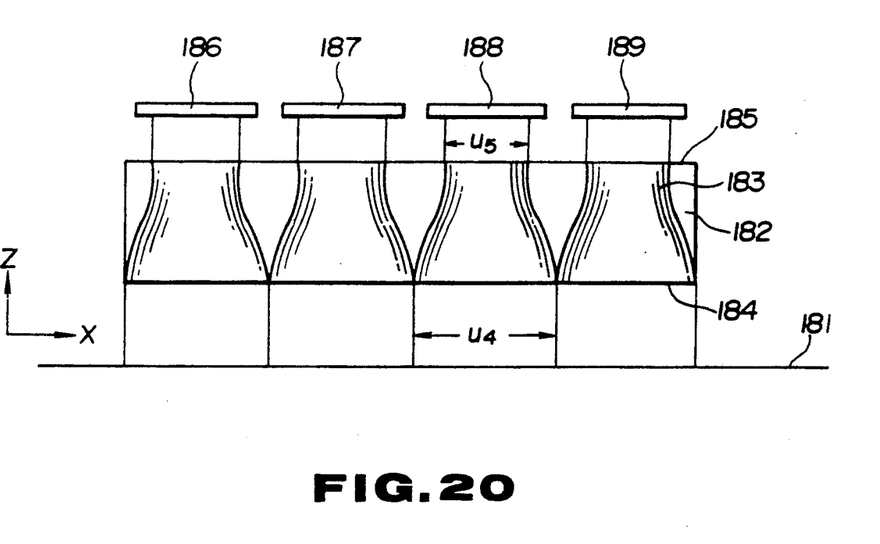
FIG. 20 is a schematic side view showing a tenth embodiment of the solid state imager of the present invention.

FIG. 20 shows a diagrammatic arrangement of the solid-state imaging apparatus of the present embodiment, in which, as shown in FIG. 20, a rod lens array 182 is provided on the document 181 with the X-direction or the document scanning direction as the longitudinal direction. The rod lens array 182 has each rod lens 183 mounted on the bottom side 184 so that the ends are consecutive in the X-direction to face the document. Although not shown, the ends of the rod lenses 183 are arrayed in a straight line in the X-direction, although not shown. These rod lenses 183 are bent in the substrate of the rod lens array 182. That is, each rod lens 183, which has an extension of a width $u_4$ on the bottom surface 184 of the rod lens array 182, is bundled to a width $u_5$ at the upper surface 185. With the solid-state imager of the present embodiment, rod lenses 183 are bundled in four units. Meanwhile, on this upper surface 185, the ends of the rod lenses 183 are arrayed in a straight line in the X-direction.

On the rod lens array 182 in which the rod lenses 183 are bundled in the X-direction by units, four line sensors 186, 187, 188 and 189 are arrayed. These line sensors 186 to 189 are arrayed with a spacing in the X-direction for receiving the light by units which have been bundled with a width $u_5$ in the rod lens array 182.

As regards the light path of the light from the document, the light proceeding in the Z-direction from the document 181 falls on the end of the rod lens array 183 facing the bottom surface 184 of the rod lens array 182 and is collimated from the width $u_4$ to the width $u_5$ along the bent rod lens 183 by each of the four units. The light collimated to the width $u_5$ from the upper surface 185 of the rod lens array 182 is received by each of the line sensors 186 to 189 to produce electrical signals.

In such case, with the solid state imager of the present embodiment, X-direction data dropout is not produced, by virtue of the bent rod lens 183, and the light is received by the line sensors 186 to 189, without causing the problem of seams. The light collimated is derived from the same scanning line of the document 181 and free from temporal deviations so that enlargement and contraction in signal processing is simplified.

Although the light is collimated by four units in the present embodiment, the invention is not so limited. The light path may also be distributed by units so that it has components in a direction normal to the X-Y plane while the light is converged in the X-direction.

What is claimed is:

1. A solid state imaging device comprising:
   a plurality of line sensors arrayed in a staggered relation, the line sensors adapted for scanning a document in a first direction,
   a rod lens array in which rod lenses are bent so that one of the ends of the rod lenses are arrayed in substantially a straight line on the document side and the other ends of the rod lenses are arrayed in a staggered relation in correspondence with the line sensors on the sensor side.

2. The solid state imaging device according to claim 1;
   wherein the rod lens array has a rectangular body in which each rod lens is bent between both the ends.

3. The solid state imaging device according to claim 1;
   wherein the rod lens array has a plurality of blocks, the blocks having the bottoms arranged in a straight line in a first direction and inclined at angles so that light from a document is transmitted to the line sensors.

4. The solid state imaging device according to claim 3;
wherein the blocks are tilted at angles so that light from a document is transmitted to the line sensors.

5. A solid state imaging device comprising:
a plurality of line sensors arrayed in a staggered relation, the line sensors adapted for scanning a document in a first direction, a rod lens array having a plurality of blocks, the blocks alternately inclined so that light from a document is transmitted to the line sensors and the bottoms of said blocks arranged in a straight line.

6. A solid state imaging device comprising:
a plurality of concave lenses for converging the light from a document which is scanned in a first direction,
a rod lens array which are mounted adjacent said plurality of concave lenses, the rod lens array having both ends of the rod lenses arrayed in substantially a straight line in said first direction,
a plurality of line sensors arrayed at one ends of the rod lenses, and
wherein each line sensor receives the light divided by the concave lenses.

7. The solid state imaging device according to claim 6;
wherein the concave lenses are provided between the document and the rod lens array.

8. The solid state imaging device according to claim 7;
wherein the concave lenses are biconcave lenses.

9. The solid state imaging device according to claim 7;
wherein the concave lenses are plano-concave lenses.

10. The solid state imaging device according to claim 9;
wherein flat surfaces of the plano-concave lenses face to the document.

11. The solid state imaging device according to claim 9;
wherein flat surfaces of the plano-concave lenses face to the rod lens array.

12. A solid state imaging device comprising:
a plurality of convex mirrors for converging the light from a document which is scanned in a first direction,
a rod lens array which are mounted adjacent said plurality of convex mirrors, the rod lens array having both ends of the rod lenses arrayed in substantially a straight line in said first direction,
a plurality of line sensors arrayed at one ends of the rod lenses, and
wherein each line sensor receives the light divided by the convex mirrors.

13. The solid state imaging device according to claim 12;
wherein the convex mirrors are inclined at the approximate angle of 45° toward the surface of the document.

14. A solid state imaging device comprising:
a plurality of convex lenses for converging the light from a document which is scanned in a first direction,
a rod lens array which are mounted adjacent said plurality of convex lenses, the rod lens array having both ends of the rod lenses arrayed in substantially a straight line in said first direction,
a plurality of line sensors arrayed at one ends of the rod lenses, and
wherein the convex lenses are provided between the rod lens array and the line sensor, and each line sensor receives the light divided by the convex lenses.

15. A solid state imaging device comprising:
a rod lens array which has both ends of the rod lenses arrayed in substantially a straight line in a first direction,
a plurality of transparent plates provided at one end of the rod lens array and mounted at different angles, and
a plurality of line sensors mounted relative to said plurality of transparent plates.

16. The solid state imaging device according to claim 15;
wherein the transparent plates are alternately mounted at two different angles, and the line sensors are arrayed in a staggered form.

* * * * *